United States Patent [19]
Markowski

[11] Patent Number: 4,474,014
[45] Date of Patent: Oct. 2, 1984

[54] PARTIALLY UNSHROUDED SWIRLER FOR COMBUSTION CHAMBERS

[75] Inventor: Stanley J. Markowski, East Hartford, Conn.

[73] Assignee: United Technologies Corporation, Hartford, Conn.

[21] Appl. No.: 303,226

[22] Filed: Sep. 17, 1981

[51] Int. Cl.³ .............................................. F02C 3/14
[52] U.S. Cl. ....................................... 60/738; 60/748; 60/760; 60/756; 60/746
[58] Field of Search ................ 60/737, 738, 748, 758, 60/760; 239/399, 461

[56] References Cited

U.S. PATENT DOCUMENTS

| | | | |
|---|---|---|---|
| 2,768,497 | 10/1956 | Hayes | 60/748 |
| 3,430,443 | 3/1969 | Richardson et al. | 60/738 |
| 3,748,853 | 7/1973 | Jones et al. | 60/737 |
| 3,768,250 | 10/1973 | Kawaguch | 60/748 |
| 4,249,373 | 2/1981 | Sotheran et al. | 60/738 |
| 4,288,980 | 9/1981 | Ernst | 60/746 |

Primary Examiner—Louis J. Casaregola
Assistant Examiner—Timothy S. Thorpe
Attorney, Agent, or Firm—Charles A. Warren

[57] ABSTRACT

A swirler for use in combustion chambers in which the vanes of the swirler are partially unshrouded to improve the mixing of fuel and air.

5 Claims, 3 Drawing Figures

PARTIALLY UNSHROUDED SWIRLER FOR COMBUSTION CHAMBERS

DESCRIPTION

Technical Field

This invention relates to combustion chambers used in high performance gas turbine engines and particularly to aircraft gas turbine engines.

Background Art

As the requirements for minimizing harmful emissions from gas turbines become more stringent the problem of maintaining high performance becomes equally stringent. The most difficult problems are the minimizing of $NO_x$ and the CO as well as unburned hydrocarbons and any change in the burner construction to reduce these emissions is helpful.

Attempts to improve combustion have generally resulted in more complex structures particularly with mechanical recirculation devices that result in power losses. The more complex structures are more expensive and more subject to failure and simplified burner constructions are accordingly most desirable.

The new high performance burners have utilized a secondary fuel and air tube extending axially centrally of the burner through at least a part of the primary combustion zone so that the secondary fuel and air mixture is discharged at the downstream end of the primary zone. There is still a need to assure adequate mixture of the secondary fuel and air and reduce or eliminate any unvaporized fuel as the mixture of fuel and air enters the secondary combustion zone.

Disclosure of Invention

A feature of the present invention is an unshrouded swirler at the end of the secondary fuel and air tube that will minimize any unmixed fuel and any fuel still liquid as the mixture enters the secondary combustion zone.

Another feature is a control of the swirler construction to assure the distribution of a well mixed secondary fuel and air across the entire area of the combustion chamber so that complete combustion will occur in a short length of the secondary zone. Thus a further feature is a swirler arrangement that permits a minimizing of the burner length by assuring the rapid combustion in a short length of the burner.

A combustion chamber of this type is shown in general in the copending application of Markowski application Ser. No. 215,891 filed Dec. 12, 1980 which describes and claims a regenerative circulation for some of the primary air and the discharge of a mixture of secondary fuel and air at a point immediately downstream of the primary zone. The present invention is in some respects an improvement on that disclosure by adding the unshrouded swirler by which to improve significantly the combustion that occurs in the secondary zone.

Another feature of the invention is a swirler, the outer part of which is unshrouded in order to permit a wider spread of the mixture of fuel and air discharging from the swirler thereby to distribute more rapidly the fuel and air over the entire area of the burner and also to provide a better mixture of the fuel and air discharging into the secondary combustion space.

According to the invention the secondary air and fuel tube that extends centrally of the primary zone in an axial direction has a swirler at the downstream discharge end and that swirler is at least partially unshrouded. The effect of this is that the tips of the vanes in the swirler create trailing vortices that cause a rapid mixing of any droplets of fuel on the vanes with the swirling air. Further the absence of the shroud also permits a greater angle of discharge of the secondary mixture from the tube thus distributing the mixture over the entire area of the burner more quickly and increasing the area of secondary combustion adjacent to the end of the tube. This rapid spreading of the secondary mixture together with the more complete mixing permits a shortening of the secondary combustion space. Obviously any shortening of the combustor with equal or improved combustion results permits a significant reduction in the weight of the overall power plant.

The foregoing and other objects, features and advantages of the present invention will become more apparent in the light of the following detailed description of preferred embodiments thereof as shown in the accompanying drawing.

BEST MODE FOR CARRYING OUT THE INVENTION

Figure 1:
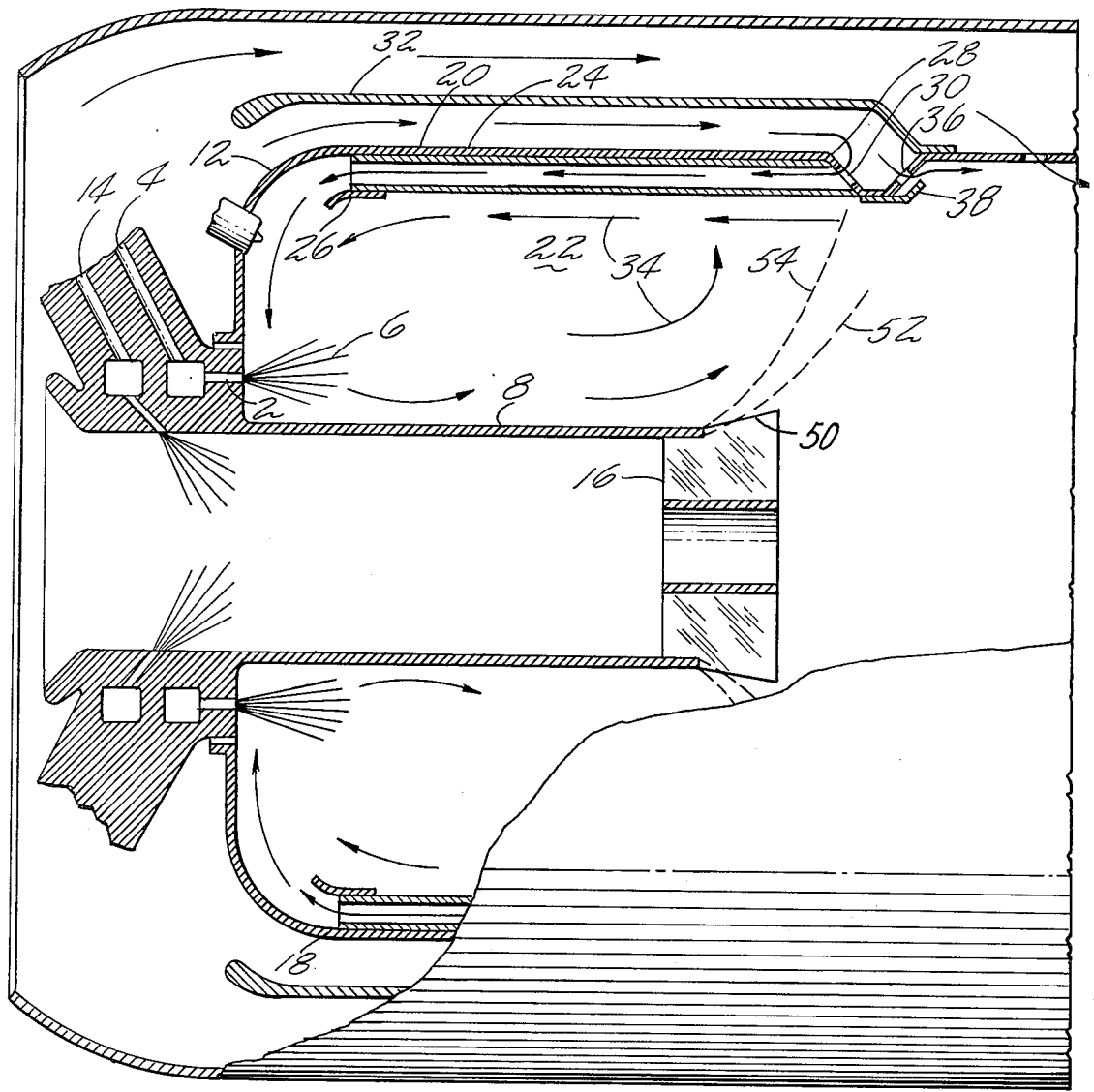
FIG. 1 is a longitudinal sectional view through a burner incorporating the invention.

The invention is shown in the type of combustion chamber described and claimed in Application Ser. No. 215,891 filed Dec. 12, 1980 above identified in which the secondary fuel mixed with air is discharged through a centrally located axially extending tube terminating at a substantial distance downstream from the end cap. Referring to FIG. 1 the primary fuel injection nozzle 2 is supplied through a duct 4 and is arranged in the form of an annulus with the fuel being discharged in a substantially conical spray 6 in a generally axial direction into the combustion chamber. The secondary fuel is mixed with air and is discharged through a tube 8 extending downstream of the combustion chamber to an open delivery end spaced substantially from the end cap 12 of the burner. Fuel for the secondary fuel nozzle of tube 8 is delivered through a duct 14. The upstream end of the tube 8 is open to receive air under pressure that mixes with the secondary fuel to discharge at the downstream end of the tube. The discharge of both primary and secondary fuel into the burner is shown schematically. Suitable nozzles for this purpose are well known. One type is described in Application Ser. No. 968,652, one of the inventors being the inventor in this application. The nozzle structure of the unit is positioned in a central opening in the cap as shown. A swirl may be imparted to the secondary fuel and air by a swirler 16 located at the discharge end of the secondary fuel tube. The burner cap 12 has sidewalls 18 and 20 extending downstream from the periphery of the cap to form the burner and to establish within the burner a primary combustion zone 22 that surrounds a secondary fuel tube 8. The primary fuel is discharged in an annular spray and at such an angle as to create a low pressure area close to the cap to instigate a recirculation or reverse flow (counterclockwise above the centerline in FIG. 1) for the fuel and air in the primary zone.

To accomplish the desired result of heating the primary combustion air as it enters the primary combustion chamber the burner walls 18 and 20 of axially extending tubes 24 are secured thereto on the inner surface preferably in spaced relation to each other and extending from a point substantially downstream of the cap forwardly to a point at the periphery of the cap. The length of the tubes axially of the burner is generally substantially as great as the transverse dimension of the burner itself although this dimension is dependent essentially on the length of the tube necessary to obtain the desired increase in temperature of the air passing through these tubes. The tubes are preferably secured to the burner walls 18 and 20 at their downstream end and are supported at their upstream end in a tube guide structure 26 in which the tubes are axially slidable such that the tubes may expand to a less degree than the burner wall itself during the operation of the device.

At a point adjacent the downstream ends of these tubes, the burner walls have offsets 28 therein and in these offsets are formed holes 30 through which the downstream ends of the tubes are secured so that air from the space outside of the burner walls may enter the downstream end of these tubes. To further direct air into the downstream ends of the tubes the burner wall is preferably surrounded by a generally cylindrical scoop or baffle 32 having an open upstream end and secured at its downstream end to the burner wall just below the offset 28. In this way the air entering the scoop is guided into the tubes and flows forwardly through the tubes to discharge into the upstream end of the primary combustion chamber.

Figure 2:
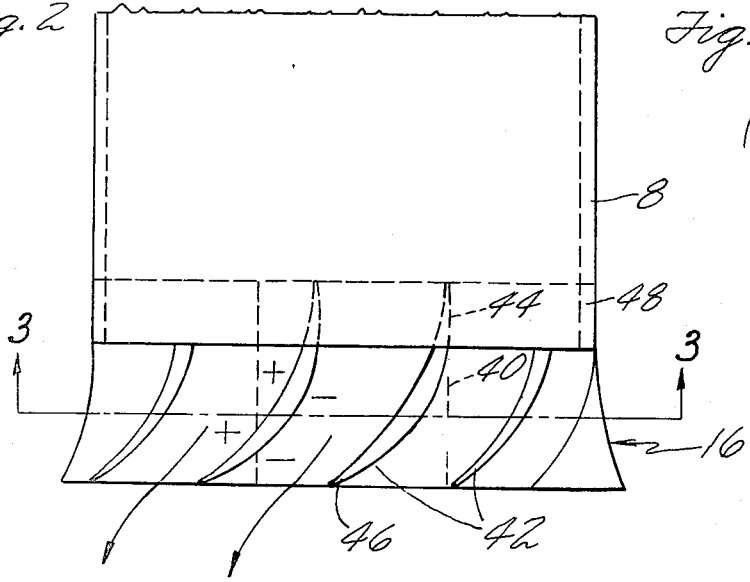
FIG. 2 is an elevational detail of the end of the secondary tube.

When the burner is in operation the fuel spray from the primary nozzle and the swirl of the air entering the primary chamber from the tubes causes a recirculation of the combustion gases in a counterclockwise direction (as seen in the upper half of the drawing) as shown by the arrows 34. This counterflow carries the combustion gases over the surface of the tubes in the same direction as the flow of air in the tubes thus more efficiently heating the air to the desired amount to improve the combustion process and significantly reduce the objectionable emissions. Since the tubes are spaced apart, they allow the combustion gas to contact more tube surface on each tube for more effective heating of the primary air flowing through the tubes. The burner wall immediately upstream of the location where the scoop is attached may have cooling air holes 36 therein and these holes may be overlaid by a ring 38 by which to guide the flow of this cooling air along the surface of the burner walls for film cooling. The swirler 16 is shown in more detail in FIG. 2 and has a central sleeve 40 with swirl vanes 42 extending outwardly therefrom. These vanes are preferably airfoil in cross section and are arranged so that the leading edge 44 of each vane is in general axially aligned for the entry of air from the tube into the space between the vanes. The vanes are then curved all in the same direction from an axial direction thereby to impart a significant swirl to the air as it passes between the vanes and is discharged at the trailing edges 46 of the vanes. The swirler has a shroud 48 surrounding a portion of the vanes from the leading edge, this shroud being an extension of the tube 8 as shown.

The greater portion of the vanes 42 are unshrouded from the downstream end of the partial shroud 48 to the trailing edges of the vanes and these vanes may have their outer ends 50 lengthened in a radial direction toward the trailing edge as shown. With the unshrouded vane portions as shown, the air and fuel mixture discharging from the tube 8 is caused to be discharged in a wider conical pattern as represented by the dot-dash line 52 in FIG. 1 than would result from a fully shrouded swirler. In this way the unshrouded swirler causes a quicker and wider distribution of the fuel-air mixture across the entire cross section area of the burner at a point directly downstream of the lower limits of the primary combustion zone represented by the dot-dash line 54.

Figure 3:
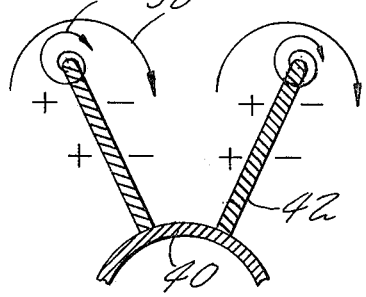
FIG. 3 is a detail showing the creation of the trailing vortices on the tips of the swirler vanes, the detail being essentially along line 3—3 of FIG. 2.

It is hoped that the fuel in the tube will all be vaporized and mixed with the air before discharging from the tube particularly with the higher combustion temperatures in the primary zone. Should there be any nonvaporized fuel reaching the swirler, that fuel will be caused to be deposited on the vanes and blown outward by the swirling action of the air flowing between the vanes. This centrifugal action carries any liquid fuel into the trailing vortices 56 created at the outer tips of the vanes by the differential pressures on opposite sides of each vane at the trailing edge. The vortices immediately pick up any fuel droplets and assure vaporization and complete mixing with the remainder of the fuel and air mixture in the vortices. The flow is in the direction of the arrows 58, FIG. 3.

Because the unshrouded vanes cause the quicker spread of the secondary fuel and air mixture transversely across the burner the effect is that the front of the secondary combustion zone is almost entirely across the burner and closely spaced from or coincident with the downstream end of the primary zone. Further with a better mixing of the fuel and air in the secondary zone the combustion takes place more completely in a shorter burner length so that complete combustion occurs closer to the swirler and thus permits a shorter burner length with the turbine inlet vanes being positioned closer to the head of the burner and closer to the swirler. Since any decrease in burner length results in a shorter engine length, the overall weight of the engine may be reduced significantly.

More particularly, however, the effective arrangement of the burner walls and the preheating of the primary air permits a better and more complete combustion in the primary zone with a resultantly increased heating of the air surrounding the mixture in the tube 8. This higher temperature assures a better vaporization of the secondary fuel and thus better mixing of the secondary fuel and air. When this hotter primary mixture reaches the unshrouded swirler where any unevaporated fuel is picked up by the trailing vortices it is thus vaporized and fully mixed with the remainder of the secondary fuel and air. By spreading this secondary mixture in a flatter or broader cone by reason of the unshrouded vanes, the secondary zone is effectively moved upstream closer to the primary zone, therefore, as above stated reducing the necessary burner length. With hotter combustion and more complete combustion as a result the undesirable emissions from the burner are materially reduced to an amount acceptable by present or expected future standards.

Although the invention has been shown and described with respect to a preferred embodiment thereof, it should be understood by those skilled in the art that other various changes and omissions in the form and detail thereof may be made therein without departing from the spirit and the scope of the invention.

I claim:

1. A burner construction including:
an end cap having a primary fuel nozzle therein;
side walls extending downstream from the cap to define the combustion chamber;
a tube extending axially downstream from said cap and centrally of the combustion chamber for secondary fuel and air;
a secondary nozzle in said cap for discharging fuel into said tube;
a swirler at the downstream end of said tube, said swirler having a plurality of radially extending swirl vanes with leading edges and trailing edges and shaped to impart a swirl to the fuel and air mixture passing over said vanes; and
a shroud extending over only a portion of the vanes from the leading edge and leaving the trailing edges and the outer ends of the vanes adjacent thereto unshrouded, thereby to provide a wider distribution of the fuel and air passing over said vanes, the unshrouded portions of the vanes increasing in length radially at their outer ends to impart a greater swirl to the secondary fuel and air mixture passing over the vanes.

2. A burner construction as in claim 1 in which the swirler has a central sleeve with the vanes extending generally radially outward therefrom.

3. A burner construction as in claim 1 in which the shroud extends for less than half the length of the vane.

4. A burner construction including:
an end cap having the primary fuel nozzle therein;
side walls extending downstream from the cap to define a combustion chamber;
axially extending tubes on the inner surface of the side walls for guiding air forwardly of the side walls for heating this air;
said tube discharging into the upstream end of the combustion chamber adjacent to the end cap;
a tube extending axially downstream from said cap and centrally of the combustion chamber for delivery of secondary fuel and air, said tube extending substantially to the end of the primary combustion zone;
a secondary nozzle in said cap for discharging fuel into said tube to mix with the air therein and a swirler at the downstream end of said tube, said swirler including a plurality of swirl vanes having leading edges and trailing edges and shaped to impart a swirl to the fuel and air mixture passing said vanes, said vanes extending generally radially of the tube; and
a shroud extending over a portion only of the vanes from the leading edge but leaving the trailing edges and the outer ends of the vanes adjacent thereto unshrouded for imparting a wider conical spray angle to the fuel and air discharging from said tube.

5. A burner construction as in claim 4 in which the unshrouded portions of the vanes increase in length toward the trailing edge to cause a wider conical distribution of the fuel and air mixture.

* * * * *